United States Patent [19]

Payà et al.

[11] Patent Number: 5,525,016

[45] Date of Patent: Jun. 11, 1996

[54] CUTTING INSERT WITH GROUPED CHIP-FORMING RIBS ARRANGED SYMMETRICALLY AND HAVING TAPERING CROSS SECTIONS

[75] Inventors: José A. Payà, Mülheim/Ruhr; Norbert Reiter, Mettmann, both of Germany

[73] Assignee: Widia GmbH, Essen, Germany

[21] Appl. No.: 162,031

[22] PCT Filed: May 14, 1992

[86] PCT No.: PCT/DE92/00410

§ 371 Date: Dec. 28, 1993

§ 102(e) Date: Dec. 28, 1993

[87] PCT Pub. No.: WO92/21467

PCT Pub. Date: Dec. 10, 1992

[30] Foreign Application Priority Data

Jun. 1, 1991 [DE] Germany ............ 41 18 065.8

[51] Int. Cl.⁶ ...................... B23B 27/22
[52] U.S. Cl. ...................... 407/116
[58] Field of Search ............ 107/114, 115, 107/116

[56] References Cited

U.S. PATENT DOCUMENTS 4,629,371 12/1986 Maeda ........................ 407/114
4,629,372 12/1986 Huston ........................ 407/116
4,710,069 12/1987 Loquist ........................ 407/114
4,934,879 6/1990 van Barneveld ............... 407/115
5,046,899 9/1991 Nishi ........................... 407/102

FOREIGN PATENT DOCUMENTS 0143758 6/1985 European Pat. Off. .
0166989 1/1986 European Pat. Off. .
0278083 8/1988 European Pat. Off. .
0404744 12/1990 European Pat. Off. .
2231631 2/1973 Germany .
2309443 9/1973 Germany .
3105377A1 10/1982 Germany .
3148535 7/1983 Germany .

OTHER PUBLICATIONS

Coromant "Metallwerkzeug-Production" vol. 4, 1987.

*Primary Examiner*—Daniel W. Howell
*Assistant Examiner*—Kenneth J. Hansen
*Attorney, Agent, or Firm*—Herbert Dubno; Yuri Kateshov

[57] ABSTRACT

Cutting inserts are provided at their rake faces with a plurality of raised chip-forming elements in the form of longitudinal ribs which can be notched to have longitudinally-separated segments and at least some of which are parallel to one another.

30 Claims, 9 Drawing Sheets

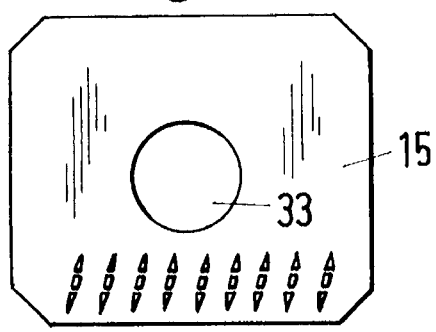
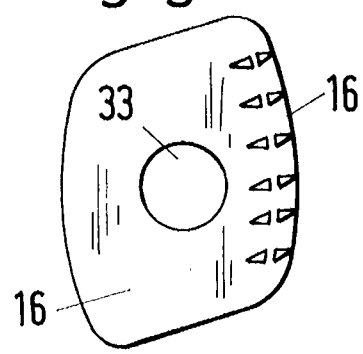
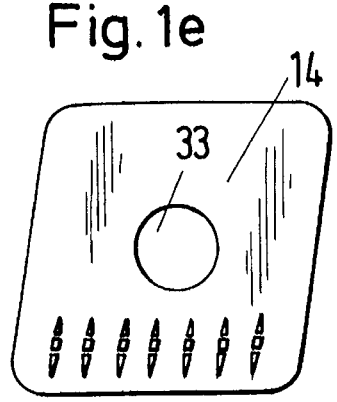
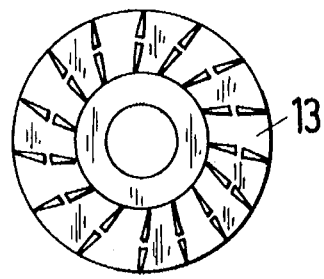
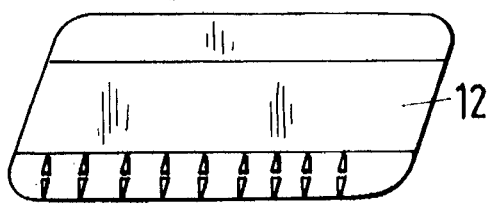
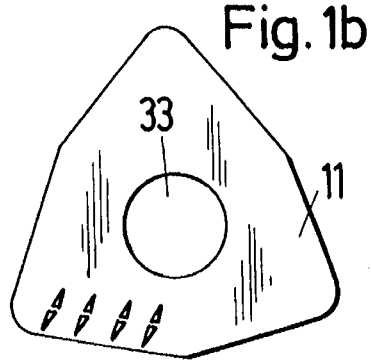
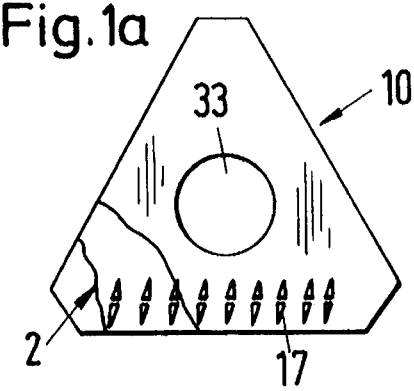

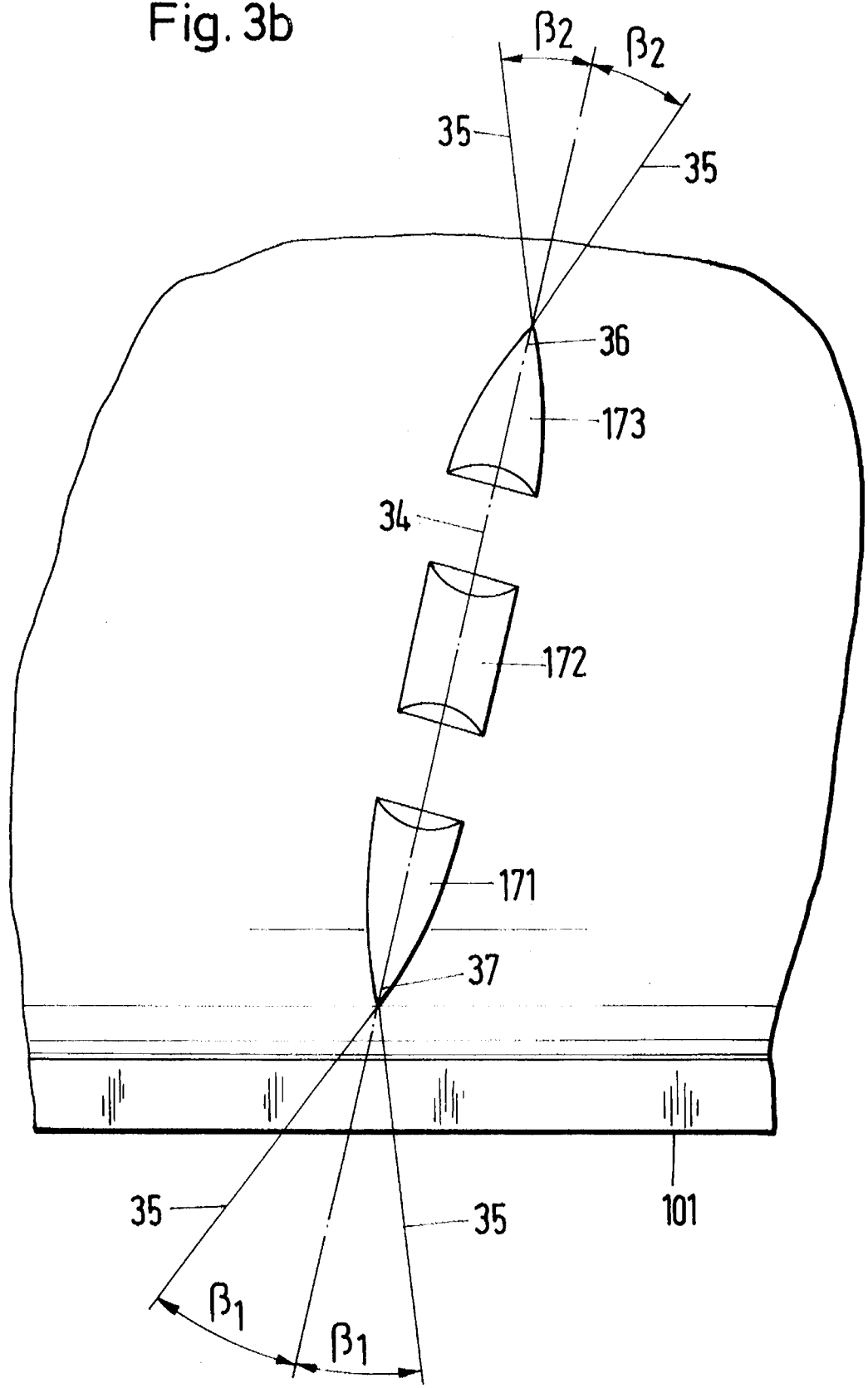

CUTTING INSERT WITH GROUPED CHIP-FORMING RIBS ARRANGED SYMMETRICALLY AND HAVING TAPERING CROSS SECTIONS

CROSS REFERENCE TO RELATED APPLICATIONS

This application is a national phase of PCT/DE 92/00410 filed 14 May 1992 and based in turn, upon German national application P 41 18 068.8 filed 1 Jun. 1991 under the International Convention.

FIELD OF THE INVENTION

The invention relates to a polygonal or circular cutting insert for chip-forming machining, which is provided at its rake faces with a plurality of raised chip-forming elements with upwardly decreasing cross sections and which are arranged in rows at a distance from the cutting edges.

BACKGROUND OF THE INVENTION

Such cutting inserts are known for instance from DE-A 22 31 631, DE-B 23 09 443 and the DE 31 48 535 C2.

DE-A 22 31 631 describes a cutting tool with chip breaker, with a cutting blade attached to the basic chipbreaker body and with a groove running parallel and next to the cutting blade, wherein at least one projection shaped like a truncated cone is provided at a point located close to the nose-like part of the basic chip-breaker body.

According to DE-B 23 09 443, in the chip-breaker groove a plurality of chip-breaking projections is provided, consisting of sphere segments arranged at intervals.

However, due to the arrangement of the chip-forming elements and the geometry of the chip-breaking groove, the mentioned cutting insert can be used only within a limited range of different cutting conditions, such as different cutting depths, advance speeds, and materials. In order to increase the range of use of the cutting insert and to improve the formation and removal of the chips, DE 31 48 535 C2 has proposed to give the chip-forming elements the basic shape of a truncated pyramid, with an essentially triangular base surface, whereby at any time one of the lines defining the base surface is oriented in the direction of the neighboring cutting edge, either parallel thereto or in a curved line.

OBJECTS OF THE INVENTION

It is an object of the present invention to further improve a cutting insert, so that the chip control in the area of the cutting edge is enhanced.

Another object is to provide a new geometry of the chip-forming elements so that the friction between the removed chip and the rake face is reduced as much as possible, in order to avoid undesirable heating of the cutting insert while in use.

SUMMARY OF THE INVENTION

These objects are attained in a polygonal cutting insert whose raised chip-forming elements are designed as longitudinal ribs, with longitudinal axes are substantially perpendicular to the cutting edge or at an acute angle to a plane normal to the cutting edge, and of which at least one of the groups of longitudinal ribs consisting of every other longitudinal rib are mutually parallel.

From U.S. Pat. No. 4,710,069 a cutting element is known with a clearance face, as well as a rake face with a chamfer and a thereto subsequent curved chip-forming surface, wherein a number of depressions arranged along each other and separated within the cutting edge are provided, in order to bridge the borderline between the chamfer and the subsequent curved rake face, whereby segments of the rake face are formed between the depressions at the height of the cutting edge, but in the depression areas deposits of chipped away material can form, which would finally lead to a metallic friction with the chip. This in turn increases the heating of the cutting insert, leading to increased wear.

While according to U.S. Pat. No. 4,710,069 the depressions extend longitudinally in a perpendicular direction-with respect to the cutting edge, EP 0 404 744 A2 proposes to arrange the depressions so that they extend longitudinally in a direction set at an angle between 5° and 45° with respect to a line perpendicular to the cutting edge. Usually the chip flow angle has a value between 5° to 125°. But even this measure can not prevent the gradual clogging of the depressions during the machining process, so that the respective rake face is "flattened" with increased use.

The present invention completely turns away from the principle of depression formation, and replaces the depressions with raised chip-forming elements designed as longitudinal ribs. Due to the fact that they extend further towards the middle of the cutting plate, these longitudinal ribs have the advantage that even for various cutting conditions with different cutting depths, even at a greater distance from the cutting edge the chip is still controlled and guided with little friction by the longitudinal ribs. In particular, the longitudinal ribs have the advantage of very good heat dissipation, so that a heating of the cutting insert in the cutting edge area is substantially reduced.

So for instance it has proven advantageous to impart to the longitudinal ribs a shape with an edge-free, convex cross section perpendicularly to the longitudinal axis of rib in an area located above the rake face plane. Preferably the convex shape should have a radius of 0.1 to 2 mm in the upper area, and even more preferably of 0.1 to 1.0 mm. In relation to a line perpendicular to the rake face, the longitudinal ribs run perpendicularly with respect to their longitudinal axis in the area of the rake face plane at an angle of at least 45°.

This can be achieved by providing a larger radius in the respective face area than in the upper area or by imparting a flat shape to the respective rib surface piece, which means that in cross section the rib surfaces run in a straight line to the rake face. Preferably in the area of the rake face, the lateral surfaces of the longitudinal ribs form an angle of 90° to 130°, seen in cross section parallel to the cutting edge. All the above-mentioned measures, considered individually or combined, serve for creating the smallest possible, but edgeless, contact surface between the longitudinal ribs as chip-forming elements and the removed chip, and on the other hand to increase the rib area so much that the friction heat generated during chip-removal can be largely dissipated over this area. This purpose is also served by the measure of selecting a corresponding base width of the longitudinal ribs in the area of the rake face. For milling tools the preferred base width is 0.2 to 0.5 mm, and for turning or drilling tools it is 0.5 to 1.5 mm.

Optimally with respect to the geometry of the chip-forming elements, the height of the longitudinal ribs in cutting insert for milling tools is 0.02 to 0.07 mm, and for turning or drilling tools it is 0.1 to 0.6 mm.

As has already been mentioned before, longitudinal ribs have the advantage that even in areas remote from the cutting edge the chip can be formed and controlled by the chip-forming elements. A preferred length for the longitudinal ribs has proven to be a value wherein the respective length is 5 times to 20 times greater than the base width of the longitudinal ribs.

The different fields of use of the cutting insert determine also the distance between two neighboring longitudinal ribs, which preferably is 0.5 to 1.5 mm for milling tools and 1.5 to 4 mm for turning or drilling tools. However these dimensions are also to be considered each time in relation to the aforementioned longitudinal rib height and depend on the field of use of the cutting insert.

A particularly suitable shape for a longitudinal rib has proven to be the configuration derived from an ellipsoid of revolution. Thereby the longitudinal ribs represent substantially the cap of an ellipsoid of revolution cut off along a plane parallel with the longitudinal axis, whereby such shapes whose surfaces end towards the rake face with a larger radius than the upper areas, respectively flat or rectilinear in cross section, are also included. At their ends directed towards the cutting edge and/or towards the middle of the cutting plate, the ribs preferably run at an acute angle to the rake face, which angle should not exceed 20° in any actual embodiment of the invention. In the aforementioned configuration of the longitudinal ribs, the preferred shape of the base surface of the longitudinal ribs formed in the area of the rake face should be oval to elongated oval.

Along the respective cutting edge, the ribs can all be parallel to each other, which includes a perpendicular direction with respect to the cutting edge, as well as a diagonal orientation, or they should be arranged in such manner that the groups of longitudinal ribs consisting of any other longitudinal ribs along a cutting edge are mutually parallel, running at a preferred angle of 1° to 45° to the plane normal to the cutting edge. This feature refers particularly to the arrangement of neighboring longitudinal ribs with respect to the normal plane of the cutting edge having the same absolute value but formed with an opposite-sense angle between 5° and 45°. This has the advantage that the cutting inserts can be inserted to turn to the left as well as to the right, whereby the chip control is each time achieved by the group of longitudinal ribs arranged in direction of the chip flow.

In a further embodiment, the longitudinal ribs can be rectilinear or curved preferably at a radius between 3 mm to 15 mm, from the point of view of the axes of the longitudinal ribs. The aforementioned angles are then selected towards the cutting edge as a discharge angle of the curved longitudinal rib.

The shape of the longitudinal ribs can be also modified according to a further embodiment of the invention, so that the longitudinal ribs have at least one notch reaching all the way to the rake face. These notches divide the longitudinal ribs into several pieces arranged in a sequence, whereby the aforedescribed geometry of the solid-body longitudinal ribs is still valid regarding the envelope curve limiting all longitudinal ribs. Due to the notches in the longitudinal ribs an additional increase of the surface of the chip-forming elements is achieved, favoring the heat dissipation, without any influence of the notches on the chip formation and the chip control. Particularly the surfaces defining the notches of the longitudinal ribs can be flat surfaces arranged at an acute angle towards the rake face, lying at an angle between 20° and 45° with respect to the rake face. Preferably the middle segments of the longitudinal ribs have a trapezoidal shape. The distance between the individual longitudinal ribs in a plane normal to the cutting edge—respectively of each longitudinal rib thought of as an envelope curve—preferably equals 0.2 to 1 mm.

As already mentioned before, the envelope curve formed by the respective longitudinal ribs arranged one after the other in the direction of the plane normal to the cutting edge is free of edges.

According to a further embodiment of the invention, particularly in the case of longitudinal ribs with a rectilinear longitudinal axis, each middle segment of the longitudinal ribs or the ends of the longitudinal ribs can be offset with respect to the next longitudinal rib by one half-width of the distance.

According to further embodiments of the invention, the longitudinal ribs are arranged at various distances from the cutting edge or they can be of various lengths, whereby preferably the respective next longitudinal ribs are located at the same distance from the cutting edge or are of equal length. In this way it is possible to arrange a longer longitudinal rib, divided by two notches into three pieces, next to a shorter longitudinal rib which is parallel thereto and wherein the middle segment has been "omitted". This shorter longitudinal rib is then offset towards the cutting edge by half the length of the middle segment of the longitudinal rib, thus being at a greater distance from the cutting edge.

Basically the chip-forming elements can be used in all known shapes and geometries of indexable inserts. This applies particularly to such cutting inserts which have a chamfer bordering along the cutting edge, which is free of chip-forming elements. This chamfer can run at an angle of 0°, but also at a positive or negative angle. According to further possible developments of the invention, the rake face immediately following the chamfer or the cutting edge can be curved, i.e. concave or convex. The respective tangential angle of inclination is thereby of 5° to 30°. In a convex rake face, which in principle is designed as a chip-breaking groove, the longitudinal ribs or the longitudinal rib segments are arranged and dimensioned so that their upper edges do not exceed the surface formed by the cutting edges.

Various configuration possibilities can be considered also regarding the shape of the cutting edge. So for instance the cutting edge can be shaped from one cutting corner to the next cutting corner, i.e. in a lateral view, convex, concave or as a free shape with a sinuous path. Also the lateral surface bordering the cutting edge can be designed as a clearance face.

BRIEF DESCRIPTION OF THE DRAWING

The above and other objects, features, and advantages will become more readily apparent from the following description, reference being made to the accompanying drawing in which:

FIGS. 1a to 1g are different top views of cutting plates;

FIG. 3b is an enlarged detail view of an alternate arrangement of the longitudinal ribs;

SPECIFIC DESCRIPTION

Figure 2:
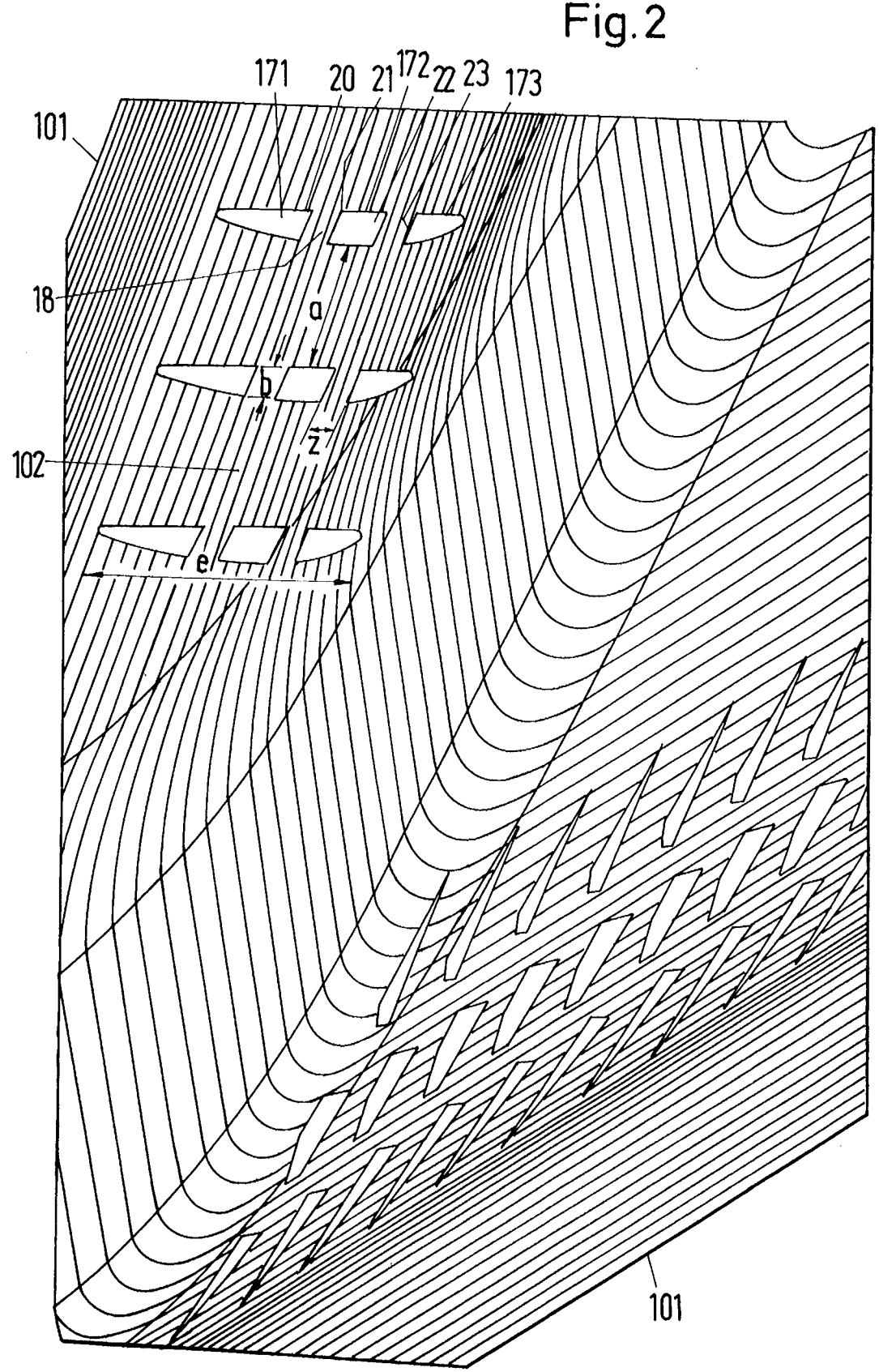
FIG. 2 is a detailed perspective view in the direction of arrow 2 of FIG. 1a of a cutting plate corner.

FIGS. 1a–1g show examples of cutting inserts, each equipped with the chip-forming elements of the invention, as sketched with the aid of FIG. 1a. So in FIG. 1a a cutting insert 10 with triangular base surface is shown. FIG. 1b shows a cutting plate 11 with six corners derived from the triangular base shape. FIGS. 1c and 1e show respective rhomboidal indexable inserts each with pairwise different, respectively identical edge length. FIG. 1d shows a circular indexable insert 13. FIG. 1f shows a square-shaped indexable insert 15 with chamfered corners, while FIG. 1g shows an indexable insert with two opposite curved edges 16a. As indicated in FIGS. 1b, d and f, the cutting plate can also have a central bore 33. As a rule, the invention can also be extended to other shapes of indexable inserts as known to the state of the art and which are not illustrated here. The arrangement of the longitudinal ribs 17 according to the invention is shown in FIG. 1a. Thereby the longitudinal ribs are oriented so that their longitudinal axis is perpendicular to the respective cutting edge. However, the longitudinal ribs can also be set diagonally, i.e. at an angle up to 45° to the plane normal to the cutting edge. As long as the cutting edges do not run in a straight line, as for instance in the case of a circular cutting plate 13, the orientation of the longitudinal ribs to the respective cutting edge tangent applies.

A detailed view of a cutting edge corner and the arrangement and configuration of the longitudinal ribs 17 of the invention, as indicated by the numeral 2 in FIG. 1a, is shown in FIG. 2 with the modification that instead of a solid-body longitudinal rib 17, the latter is divided by two notches 18 into three body segments 171, 172 and 173. The envelope surface of the segments bordering the longitudinal-rib segments 171 to 173 has an edge-free convex contour and basically the shape of a partial ellipsoid of rotation, which is formed through a section along a plane parallel to the longitudinal axis. The base surface of each of the longitudinal ribs 17 is in this case oblong-oval. The longitudinal ribs 17 formed by the longitudinal-rib segments 171 to 173 are mutually parallel and perpendicular to the respective cutting edge 101. The largest base width b measured in the area of cut 18 of the middle longitudinal-rib segment 172 ranges between 0.2 mm to 0.5 mm in cutting inserts for milling tools, in the case of cutting tools for turning, respectively drilling, it ranges between 0.5 mm and 1.5 mm. The total length of the longitudinal ribs amounts to about 5 times to 10 times the value of the mentioned base width b. The upper faces of the longitudinal ribs 171 and 173 run on the rake face marked with 102 which surrounds the longitudinal ribs, level towards the cutting edge 101 up to the opposite end, preferably at an angle of less than 20°. The cuts 18 are selected so that the bordering flat surfaces 20 and 21 on the one hand, as well as 22 and 23 on the other hand, are bevelled towards the rake face 102, approximately at an angle of 30°. The distance z between the individual longitudinal-rib segments 171 and 172, respectively 172 and 173, measured in the area of the rake face 102 equals 0.2 to 1 mm, while the distance a between two neighboring longitudinal ribs 17 in milling tools lies between 0.5 to 1.5 mm and in turning or drilling tools between 1.5 and 4 mm.

Figure 3A:
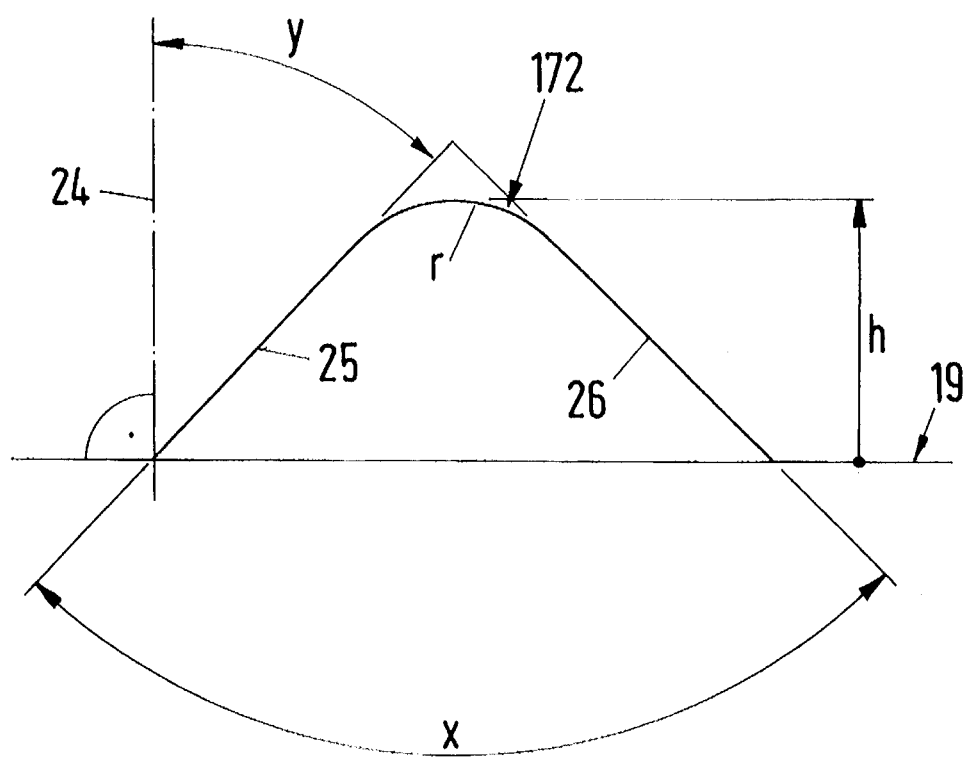
FIG. 3a is a cross-sectional view perpendicular to the longitudinal axis through a chip-forming element according to the invention.

The contour of the cross section through the middle longitudinal-rib segment 172 can be seen from FIG. 3a. In the upper area, the radius of curvature r is approximately of 0.3 mm, while the radius to the rake surface 19, which here is flat, can be increased, possibly even infinitely large. The size of the angle y resulting from the position of the lower area with respect to a normal 24 is of at least 45°. The size of the angle x determined by the inclination angle of the lateral surface segments 25 and 26 is of approximately 90°. The maximal height h of the longitudinal ribs is of 0.07 mm in milling tools and of 0.6 mm in turning tools. The preferred contour of the cross section remains the one shown in FIG. 3 (parallel to the cutting edge 101) and each distance between the cutting edges is basically preserved.

FIG. 3b shows a different kind of arrangement of the longitudinal ribs 171 to 173, with respect to their diagonal position to the cutting edge 101. The longitudinal axis 34 forms with the cutting edge 101 an angle which is larger than 45°. The longitudinal-rib segments 171 and 173 are shaped like wedges towards their ends marked with the reference numerals 36 and 37, whereby the respective tangents 35 form with the longitudinal axis an angle between 5° and 15°.

Further embodiments of the cutting insert shown in FIGS. 2 and 3 can be seen in FIG. 4. The longitudinal-rib segments 171 to 173 which can be seen there are arranged, from the point of view of their longitudinal axis, in the direction of a line 28 perpendicular to the cutting edge 101. However this line can also be curved (see FIG. 5a). Adjacent to this cutting edge 101 there is a chamfer 27, which (see FIGS. 4c and d) runs horizontally (0° - orientation) or can have a positive or negative angle. The thereto adjacent cutting edge 19 can be concave (FIGS. 4b to d) or convex (FIG. 4e). Also the longitudinal ribs 17, respectively the longitudinal-rib segments 171 to 173 are adjusted to the contour of rake face so that their base longitudinal axis assumes the same curved concave or convex course followed by the rake face 19. As shown in FIG. 4b, the upper crest areas of the longitudinal-rib segments 171 to 173 are limited by an envelope curve whose radius is larger than the respective radius of the surrounding rake face 19. However in the modification shown in FIG. 4c, the middle longitudinal-rib segment 172 can project heightwise over the neighboring longitudinal-rib segments 171 and 173.

Figure 4A:
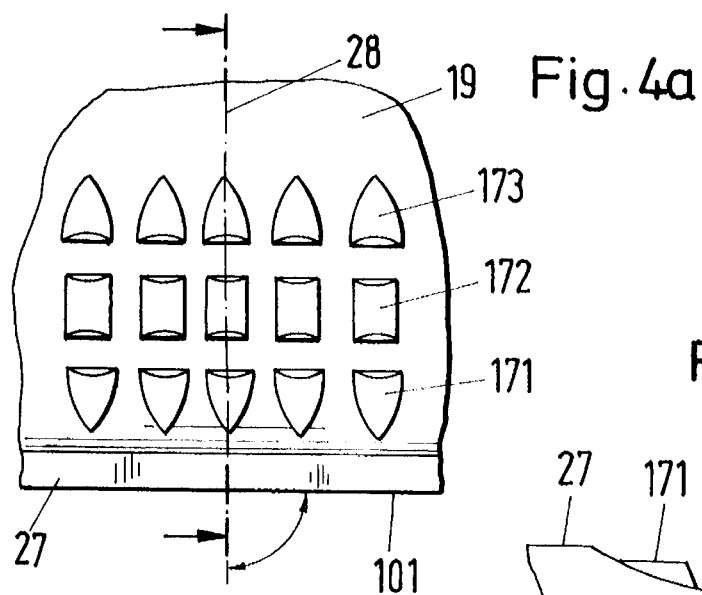
FIGS. 4a to 4e are detail views of rake face areas close to the cutting edge, with longitudinal ribs having notches.
Figure 4B:
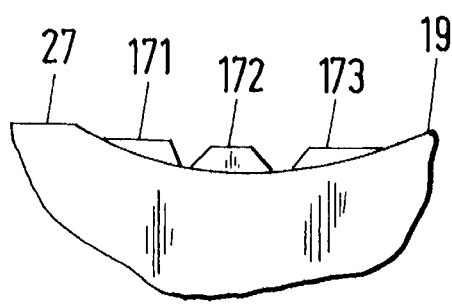
Figure 4C:
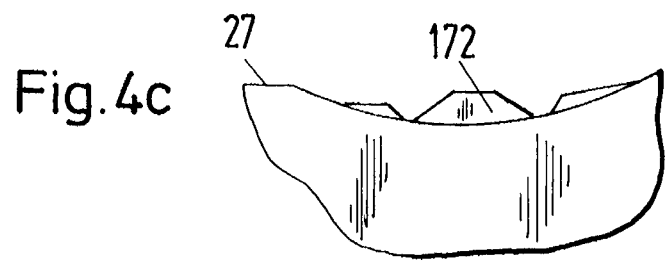
Figure 4D:
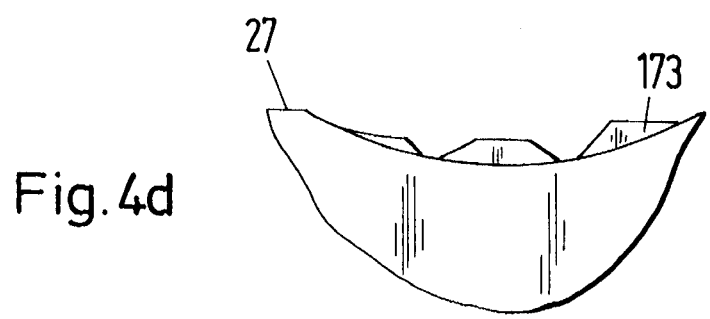

In an alternate embodiment, according to FIG. 4c the middle longitudinal-rib segment 172 projects in height over the respective neighboring longitudinal-rib segments; the same applies to the last longitudinal-rib segment 173 according to FIG. 4d with respect to the preceding segments 172 and 171.

Figure 4E:
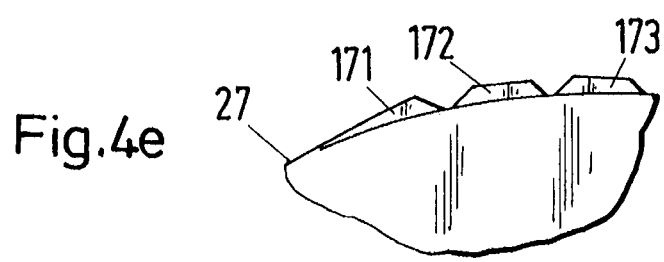

FIG. 4e shows a vaulted rake face, which continues edgelessly with the negative chamfer 27 and whereupon the longitudinal-rib segments 171, 172, 173 are arranged in succession. However, any other desired variants of the individual features resulting from the drawing are also possible.

Further embodiment variants of the arrangement of the longitudinal ribs are illustrated in FIGS. 5a–5c and 6a–6c. So for instance according to the top view in FIG. 5a the longitudinal-rib segments 171 to 173 are not rectilinear but follow a curved path 29. According to FIG. 5b the middle longitudinal-rib segments 172 are staggered by a distance equal with a/2, so that immediately following the chamfer 27 there is a first row of longitudinal-rib segments 171, each being parallel and at a distance from the cutting edge, but which are succeeded by a second row of middle longitudinal-rib segments 172, whose configuration (see also FIG. 2) is approximately trapezoidal seen in longitudinal cross section and which in the cross section perpendicular thereto are shaped according to FIG. 3a. In a third row the end-side longitudinal-rib segments 173 follow.

Figure 5A:
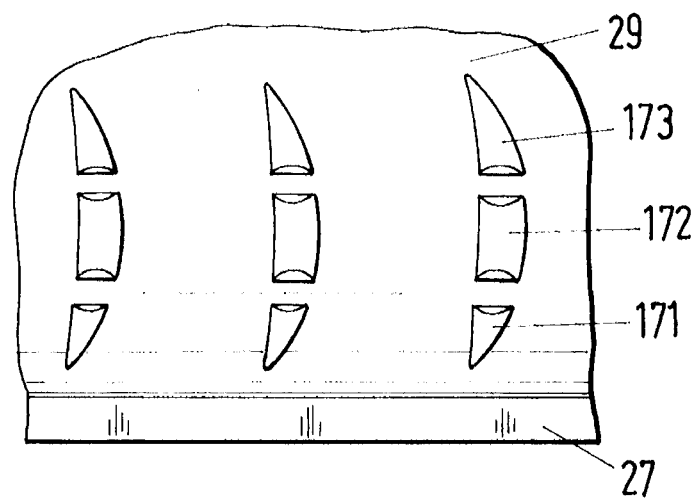
FIGS. 5a to c and FIGS. 6a to c are detail views of rake face areas close to the cutting edge, with further embodiments of the longitudinal ribs.
Figure 5B:
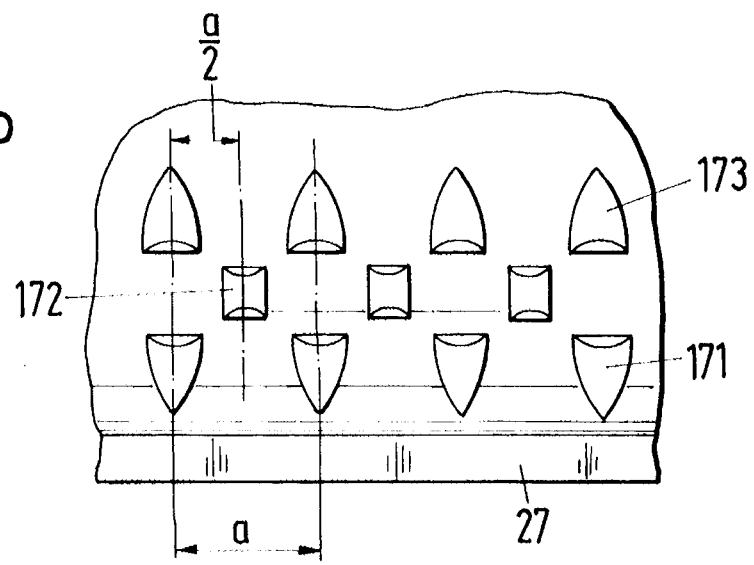
Figure 5C:
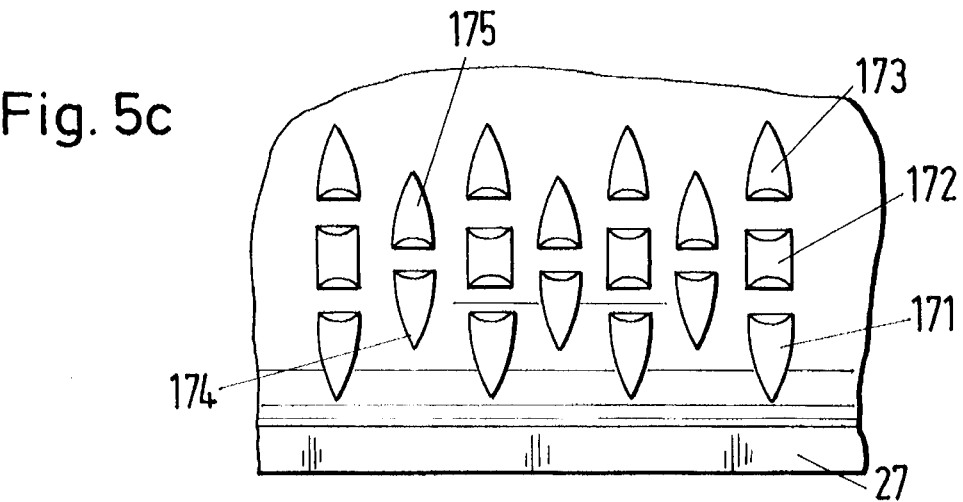

In the embodiment of FIG. 5e, longitudinal ribs 17 of various length and subdivided in various ways are used. Any second of the longitudinal-rib segments 171 to 173 are shown in accordance with the arrangement shown and described in FIG. 4a. In between and offset by a distance of a/2 from the neighboring longitudinal-rib segments there are longitudinal ribs 174 and 175, whose configuration corresponds to the one of the longitudinal-rib segments 171 and 173. Between them a notch 18 is provided, as shown and described in connection with FIG. 2. However in the longitudinal rib 17 composed of longitudinal-rib segments 174 and 175 the middle longitudinal-rib segment 172 has been altogether eliminated, which considerably shortens the length of this entire longitudinal rib. Offset to the rear, towards the middle of the cutting edge by half a length of the middle longitudinal-rib segment 172, the longitudinal-rib segment 174 is correspondingly provided. The embodiments shown in FIGS. 5b and 5c are not in any way limited to such designs of the longitudinal ribs which are arranged perpendicularly to the cutting edge. The respective longitudinal ribs can also be arranged along a curved path 29 (see FIG. 5a).

Figure 6A:
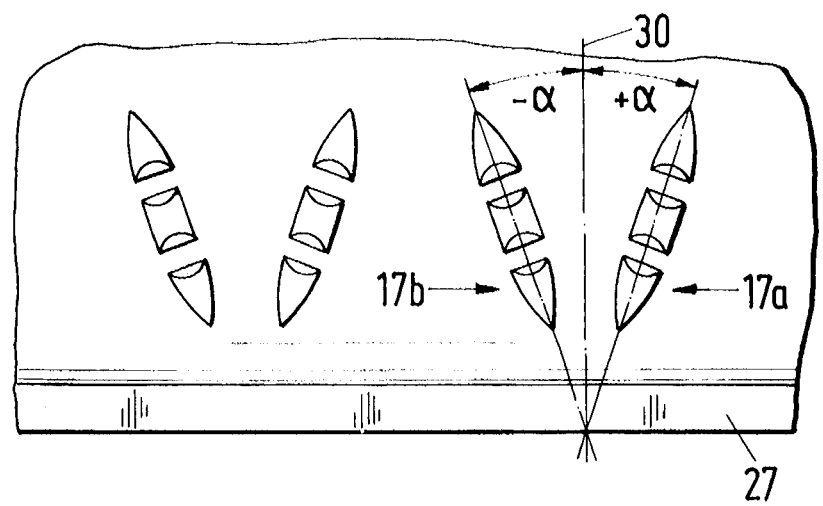
Figure 6B:
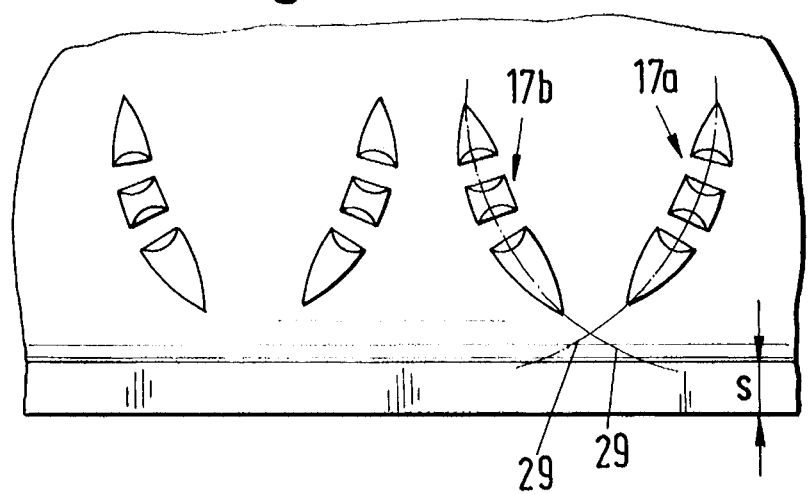
Figure 6C:
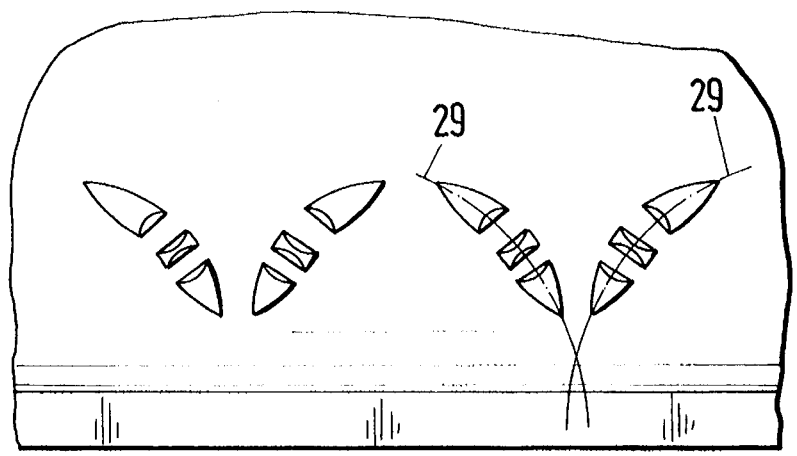

In FIG. 6 such arrangements of the longitudinal ribs 17a and 17b, which are set diagonally to the plane normal to the cutting edge are provided, and namely in such a way that the respectively created angle has an opposite direction of rotation, as is indicated by the sign. This embodiment has the advantage that the respective cutting plate can be inserted for right as well as left turning. In a corresponding modification according to FIG. 6b the longitudinal ribs 17a and 17b inclined by an angle with respect to the absolute value do not lie on a straight line, but follow a curved path 29, which can be either convex (FIG. 6b) or concave (FIG. 6c). Even when in FIGS. 6a–6c longitudinal ribs are shown which consist of three segments, the present invention extends also to such longitudinal ribs which are made of more than three segments succeeding each other, as well as to combinations according to FIGS. 4a–4e and 5a–5c.

Figure 7A:
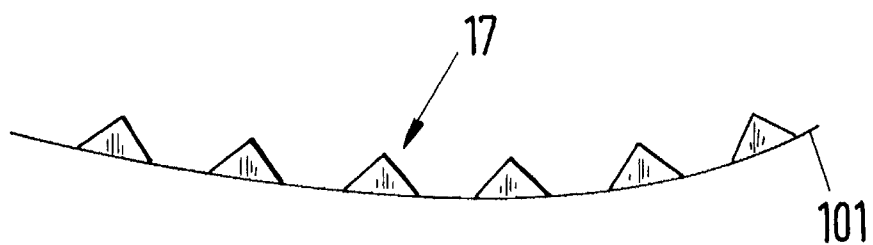
FIGS. 7a to 7c are diagrams of different shapes of cutting edges.
Figure 7B:
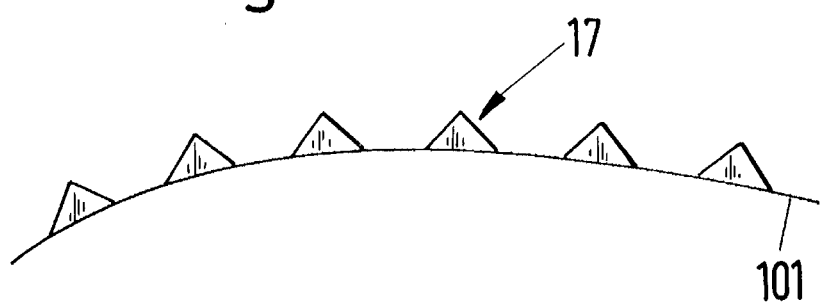
Figure 7C:
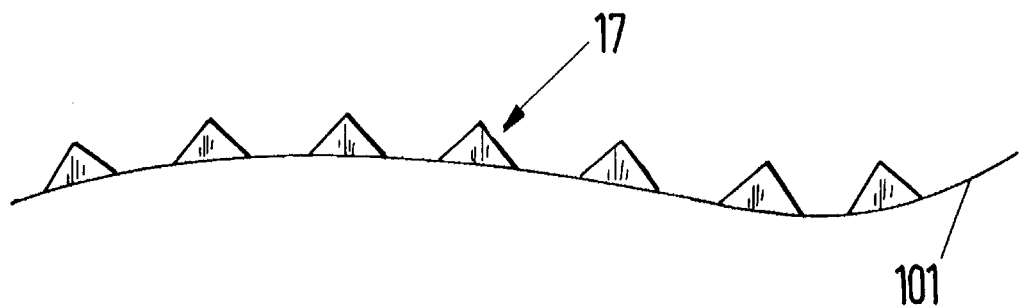

The contour of the cutting edge from one cutting corner to the next can be designed according to FIGS. 7a–7c to be positive (FIG. 7a), negative (FIG. 7b) or to have a free shape (FIG. 7c). The longitudinal ribs 17 as raised chip-formation elements can be designed either as solid bodies or separated in segments by notches 18.

Figure 8A:
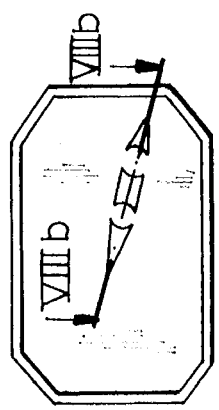
FIG. 8a is an elevation and FIG. 8b a sectional view along line VIIIb—VIIIb of FIG. 8a of an area close to the cutting edge seen in the longitudinal direction of the longitudinal ribs.
Figure 8B:
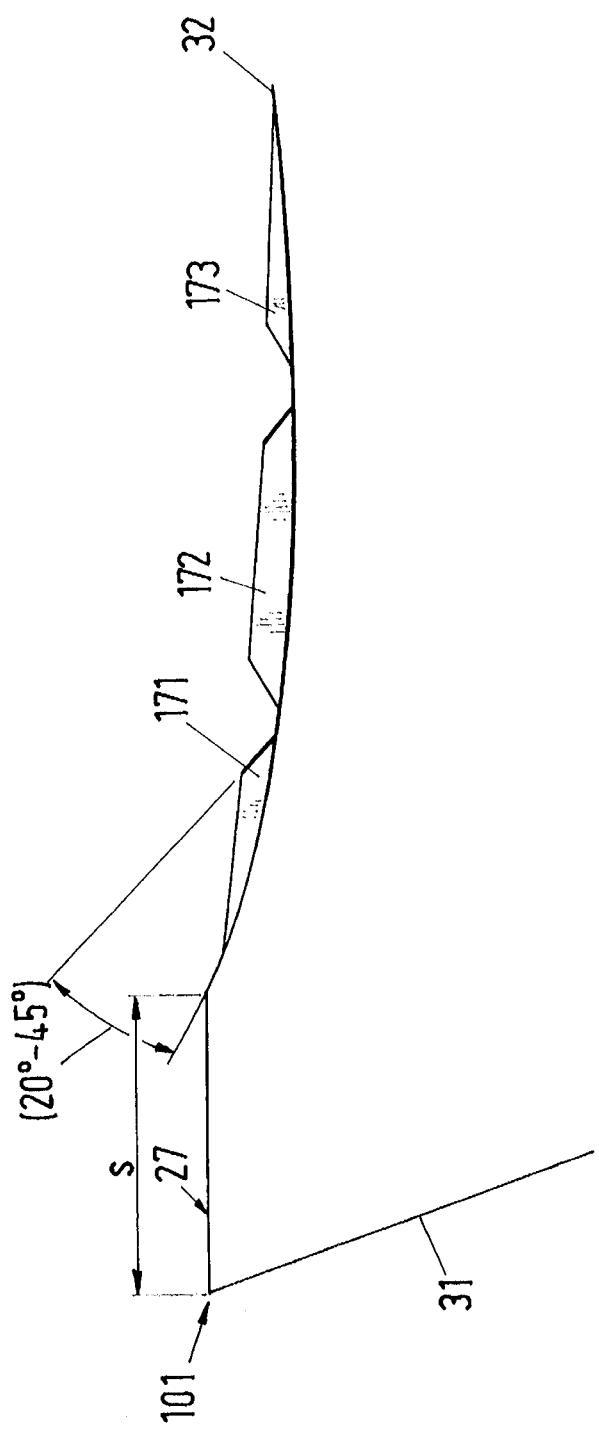

A cross-sectional view through the longitudinal axis of the longitudinal ribs is shown in FIGS. 8a and 8b. The lateral surface is a clearance face 31, succeeded in the area of the rake face at first by a chamfer 27 with a width s, bordering on a convex rake face 32. The chamfer can also be eliminated, i.e. s=0 can be selected. The tangential angle of inclination of the rake face 32 to the horizontally running chamfer 27, respectively to a corresponding horizontal line, can range between −150° and +20°. In the area of the convex rake faces 32, the longitudinal-rib segments 171, 172 and 173 lie one after the other, their uppermost edge being clearly below the plane defined by the cutting edges 101. The longitudinal-rib segments 171 to 173 can run perpendicularly to the cutting edge 101, as well as at an acute angle on a straight or a curved line.

We claim:

1. A cutting insert for chip-forming machining, comprising:

an insert body having a cutting edge; and at least one rake face adjacent the cutting edge and provided with a plurality of elongated raised chip-forming ribs arranged as groups of ribs in respective rows at a distance from the cutting edge and extending along respective line segments substantially perpendicular to the cutting edge or running at an acute angle ($\alpha$) to a plane normal to the cutting edge, the line segments of at least one of said groups of longitudinal ribs being parallel to one another, each of said ribs being formed with a respective cross-section decreasing with distance from the rake face, each of said ribs being subdivided into a plurality of rib segments, the rib segments of each of said ribs including two terminal segments spaced from one another and formed with respective inner faces defining at least one notch between said terminal segments, the inner faces diverging with respect to one another outwardly from said rake surface and transversely to the respective line segment, each of said inner faces being the widest portion of the respective terminal segment at the respective notch, each of said terminal segments being generally symmetrical with respect to the line segment and converging and tapering oppositely to respective points at the line segment.

2. The cutting insert defined in claim 1 wherein the longitudinal ribs, transversely to respective segment lines, being formed with respective convexly and edgelessly shaped cross sections on the rake face.

3. The cutting insert defined in claim 2 wherein the respective cross section of each rib has a convex shape so that a respective outer land spaced from said rake face is formed with a radius (r) of 0.1 to 2 mm.

4. The cutting insert defined in claim 1 wherein, with respect to a plane normal to the rake face, the longitudinal ribs run perpendicular to respective segment lines in an area of the rake face at an angle (y) of at least 45° or have wedge-shaped frontal ends or rear ends and run at a wedge angle.

5. The cutting insert defined in claim 4 wherein the longitudinal ribs terminate towards the rake face with a greater radius than in an upper area or run evenly or in a straight line towards the rake face.

6. The cutting insert defined in claim 1 wherein each of the longitudinal ribs has a respective pair of side faces converging to one another at an angle (x) of 90° to 130° in a region of the rake fact.

7. The cutting insert defined in claim 1 wherein a greatest base width of the longitudinal ribs, measured in the area of the rake face is 0.2 to 0.5 mm for milling tools and 0.5 to 1.5 mm for turning or drilling tools.

8. The cutting insert defined in claim 1 wherein a height (h) of the longitudinal ribs is 0.02 to 0.07 mm for milling tools, or 0.1 to 0.6 mm for turning, respectively drilling tools.

9. The cutting insert defined in claim 1 wherein a length (l) of the longitudinal ribs is 5 times to 20 times greater than a base width (b) thereof.

10. The cutting insert defined in claim 1 wherein a distance between two neighboring longitudinal ribs is 0.5 to 1.5 mm for milling tools and for turning drilling tools it is 1.5 to 4 mm.

11. The cutting insert defined in claim 1 wherein the ribs have the shape of a cap of an ellipsoid of rotation, cut off in a plane parallel to the longitudinal axis.

12. The cutting insert defined in claim 11 wherein the longitudinal ribs, at ends directed towards the cutting edge and/or towards a middle of the cutting plate, run with respect to the rake face at an acute angle of less than 20°.

13. The cutting insert defined in claim 1 wherein a base surface of the longitudinal ribs formed in a region of the rake face is oval.

14. The cutting insert defined in claim 1 wherein the parallel line segments run at an angle between 1° and 45° to said plane normal to the cutting edge.

15. The cutting insert defined in claim 1 wherein neighboring longitudinal ribs are arranged with respect to the plane normal to the cutting edge at an angle between 5° to 45°.

16. The cutting insert defined in claim 1 wherein the the segment lines run in curved line at a radius between 3 and 15 mm.

17. The cutting insert defined in claim 1 wherein the longitudinal ribs have at least one notch reaching all the way to the rake face.

18. The cutting insert defined in claim 17 wherein faces defining the notches of the longitudinal ribs form flat faces arranged at an acute angle to the rake face.

19. The cutting insert defined in claim 17 wherein distances (z) between longitudinal-rib segments of a longitudinal rib determined by a common envelope curve range between 0.2 to 1 mm.

20. The cutting insert defined in claim 17 wherein an envelope surface, formed by longitudinal-rib segments and running in a direction of the plane normal to the cutting edge, is edgeless.

21. The cutting insert defined in claim 1 wherein the longitudinal ribs taper downwardly toward the rake face at an acute angle ranging between 20° to 45°.

22. The cutting insert defined in claim 1 wherein each of said ribs further has a respective another longitudinal-rib segment located between a respective pair of terminal segments and having a respective trapezoidal cross section.

23. The cutting insert defined in claim 22 wherein said each other segment is staggered by half an interval width (a/2) with respect to a next longitudinal rib.

24. The cutting insert defined in claim 23 wherein the longitudinal ribs are arranged at different distances from the cutting edge.

25. The cutting insert defined in claim 24 wherein the longitudinal ribs are of different lengths.

26. The cutting insert defined in claim 1 wherein along the cutting edge and bordering the same a chamfer is provided which is free of chip-forming elements.

27. The cutting insert defined in claim 26 wherein the chamfer runs at an angle of 0° to a positive, or negative angle.

28. The cutting insert defined in claim 26 wherein the rake face adjacent to the chamfer is curved.

29. The cutting insert defined in claim 1 wherein the cutting edge, in a side view, has a convex or concave or sinuous shape.

30. The cutting insert defined in claim 1 wherein the insert has lateral faces which are clearance faces.

* * * * *